US009563236B2

(12) United States Patent
Rittenhouse (10) Patent No.: US 9,563,236 B2
(45) Date of Patent: Feb. 7, 2017

(54) ADJUSTABLE TENSION WRAP END HINGE

(71) Applicant: Intel Corporation, Santa Clara, CA (US)

(72) Inventor: David A. Rittenhouse, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/796,832

(22) Filed: Jul. 10, 2015

(65) Prior Publication Data

US 2016/0010375 A1    Jan. 14, 2016

Related U.S. Application Data

(60) Provisional application No. 62/023,670, filed on Jul. 11, 2014.

(51) Int. Cl.
*E05D 11/08* (2006.01)
*G06F 1/16* (2006.01)

(52) U.S. Cl.
CPC ........... *G06F 1/1683* (2013.01); *G06F 1/1618* (2013.01); *G06F 1/1681* (2013.01); *E05Y 2900/606* (2013.01)

(58) Field of Classification Search
CPC .............. Y10T 16/547; Y10T 16/5474; Y10T 16/5475; Y10T 16/5403; Y10T 16/54038; Y10T 16/5325; Y10T 16/53864; Y10T 16/540345; G06F 1/1681; G06F 1/1616; G06F 1/1618; G06F 1/1683; H05K 5/0226; H04M 1/0214; H04M 1/0216; H04M 1/022; E05Y 2900/606; E05D 3/12; E05D 3/06; E05D 11/06; E05D 11/333
See application file for complete search history.

(56) References Cited

U.S. PATENT DOCUMENTS

| 5,325,984 | A | * | 7/1994 | Ady | B65D 43/165 220/817 |
| 5,632,066 | A | * | 5/1997 | Huong | G06F 1/1616 16/338 |
| 5,682,645 | A | * | 11/1997 | Watabe | G06F 1/1681 16/338 |

(Continued)

FOREIGN PATENT DOCUMENTS

| JP | 09062399 A | * | 3/1997 |
| JP | 2004176446 A | * | 6/2004 |

(Continued)

*Primary Examiner* — Chuck Mah
(74) *Attorney, Agent, or Firm* — Blakely, Sokoloff, Taylor & Zafman LLP (57) ABSTRACT

Embodiments are generally directed an adjustable tension wrap end hinge. A hinge assembly includes a first wrap end component and a second wrap end component; a first axle and a second axle, the wrap section of the first wrap end component being wrapped at least in part around a first portion of the first axle adjacent to a first end of the first axle, and the wrap section of the second wrap end component being wrapped at least in part around a first portion of the second axle adjacent to a first end of the second axle; and a first tension screw to adjust a tension of the first wrap end component on the first axle and a second tension screw to adjust a tension of the second wrap end component on the second axle.

30 Claims, 10 Drawing Sheets

(56) References Cited

U.S. PATENT DOCUMENTS

| | | | | |
|---|---|---|---|---|
| 6,154,359 A * | 11/2000 | Kamikakai | ............ | G06F 1/1618 16/342 |
| 8,732,908 B2 * | 5/2014 | Hatano | ................ | E05D 11/082 16/342 |
| 2001/0016969 A1 * | 8/2001 | Fujita | ................... | G06F 1/1616 16/342 |
| 2003/0172497 A1 * | 9/2003 | Cha | ...................... | E05D 11/082 16/342 |
| 2004/0134033 A1 * | 7/2004 | Raines | ............... | G02B 27/0149 16/342 |
| 2004/0194256 A1 * | 10/2004 | Chen | .................... | G06F 1/1679 16/366 |
| 2006/0238970 A1 * | 10/2006 | Ukonaho | ............. | H04M 1/022 361/679.01 |
| 2011/0072620 A1 * | 3/2011 | Wang | ................... | G06F 1/1681 16/342 |
| 2011/0099761 A1 * | 5/2011 | Wang | ................... | G06F 1/1681 16/339 |
| 2011/0147398 A1 * | 6/2011 | Ahee | .................... | G06F 1/1626 220/810 |
| 2011/0154614 A1 * | 6/2011 | Chien | ................ | E05D 11/1014 16/297 |
| 2013/0111704 A1 * | 5/2013 | Mitsui | .................. | H04M 1/022 16/250 |
| 2013/0135809 A1 * | 5/2013 | Uchiyama | ............. | G06F 1/1681 361/679.09 |
| 2013/0170108 A1 * | 7/2013 | Lin | ....................... | G06F 1/1618 361/679.01 |
| 2013/0175914 A1 * | 7/2013 | Lin | ....................... | G06F 1/1681 312/327 |
| 2013/0318746 A1 * | 12/2013 | Kuramochi | ........... | G06F 1/1681 16/342 |
| 2013/0322004 A1 * | 12/2013 | Park | ........................ | F16C 11/10 361/679.27 |
| 2013/0342974 A1 * | 12/2013 | Hung | .................... | G06F 1/1681 361/679.01 |
| 2014/0033477 A1 * | 2/2014 | Wang | .................... | G06F 1/1681 16/376 |
| 2014/0338483 A1 * | 11/2014 | Hsu | ......................... | F16H 21/44 74/96 |
| 2015/0047446 A1 * | 2/2015 | Lai | ........................... | E05D 3/12 74/96 |
| 2015/0245511 A1 * | 8/2015 | Hsu | ......................... | E05D 3/122 74/63 |
| 2015/0309539 A1 * | 10/2015 | Kamphuis | ............. | G06F 1/1681 361/679.27 |

FOREIGN PATENT DOCUMENTS

| | | | | |
|---|---|---|---|---|
| JP | 2012237417 A | * | 12/2012 | |
| KR | WO 2011093552 | * | 8/2011 | ............ H04M 1/022 |

\* cited by examiner

ADJUSTABLE TENSION WRAP END HINGE

CROSS REFERENCE TO RELATED APPLICATIONS

This United States patent application is related to, and claims priority to U.S. Provisional Patent Application No. 62/023,670 filed Jul. 11, 2014, entitled "Adjustable Tension Wrap End Style Hinges", the entire contents of which are incorporated herein by reference.

TECHNICAL FIELD

Embodiments described herein generally relate to the field of mechanical couplings for devices and, more particularly, to an adjustable tension wrap end hinge.

BACKGROUND

Mobile electronic devices such as laptop computers, notebook computers, and two-in-one computers commonly have a display screen that is coupled to a base unit by one or more hinges. The hinges allow for closing the device into a flat position and opening the device into an angled position, and, in some instances, folding the display screen around to put the device into a tablet computer configuration.

However, in order provide such function, the hinges are required to both provide free movement and provide sufficient torque such that the display screen will be stable in any position. Hinges that are implemented in devices such as mobile devices may include wrap end style hinges, in which a wrap element is wrapped at least in part around an axle.

However, conventional wrap end style hinges generally do not provide for adjustment. In manufacturing, if an assembled wrap end hinge fails certain guidelines for tension specification the hinge generally is discarded, which increases the cost of the hinges due to the drop in production yield.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to an adjustable tension wrap end hinge.

For the purposes of this description:

"Wrap end hinge" means a hinge that includes a wrap section, including, but not limited to, a metal strip or bar, that is curved to wrap at least in part around an axle (also referred to as a shaft and other terms) or other similar element.

"Mobile electronic device" or "mobile device" means an electronic computing device that may be transported, including, but not limited to, a smartphone, tablet computer, laptop or notebook computer, convertible or 2-in-1 (two-in-one) computer (which may convert between, for example, a laptop mode and a tablet mode), mobile internet device, or other similar electronic device.

Mobile electronic devices such as laptop computers, netbook computers, and convertible computers commonly includes hinge elements that provide for coupling subparts of the device. In certain devices a first subpart (generally referred to herein as the base of the device) may include, for example, a keyboard, battery, and a majority of electronics for the device, and a second subpart (generally referred to herein as the display screen) may include a touch screen or other display and related electronics. However, the components contained in each subpart will vary depending on the particular implementation. For example, the first subpart may be limited to a keyboard and other input elements, with the other components being contain in the second subpart.

However, the hinge elements for a mobile device are required not only to provide for coupling the first and second subparts and allowing motion of the subpart in relation to each other, but further to provide sufficient resistance to hold the subparts in various angles with respect to each other. In a particular example, the hinge elements of a laptop or notebook computer are required to hold the display screen in in various positions to allow a user to view the display screen while utilizing the device.

In some embodiments, a hinge assembly provides for adjustable tension in a wrap end hinge structure, thus allowing for adjustment of tension as required in response to material and manufacturing variations in the hinges. In this manner, such an adjustable tension hinge structure allows for improved yield in manufacturing as hinges may be adjusted if the tension is outside of applicable standards for a certain implementation. This adjustability allows for improved yield during manufacturing, and further enables the adjustment of different tensions different hinge pivot axis implementations. In contrast, conventional wrap end hinges of this type lack adjustability and if the tension or torque for a hinge is too weak or too strong, the hinges are commonly rejected during manufacturing. Embodiments of the present invention allow for adjustable tension, thereby improving yield, and reducing overall costs for manufacturing.

In some embodiments, tension adjustment screws for wrap end hinges allow a wide range of tensions to be set during hinge manufacturing. This factor allows lower costs by enabling the use of a single wrap end component in multiple hinges with different torque specifications. In some embodiments, a 360-degree folder style hinge provides a dual axis to allow complete rotation. In some embodiments, an adjustable tension hinge incorporated into a folder style hinge may be implemented in, for example, clamshell design of devices with a single axis as well as a dual axis. The adjustment screw of an adjustable tension hinge assembly further allows less differential torque with direction of rotation in comparison with conventional wrap end hinges. In production, hinges may be processed through a tension adjustment process.

Figure 1A:
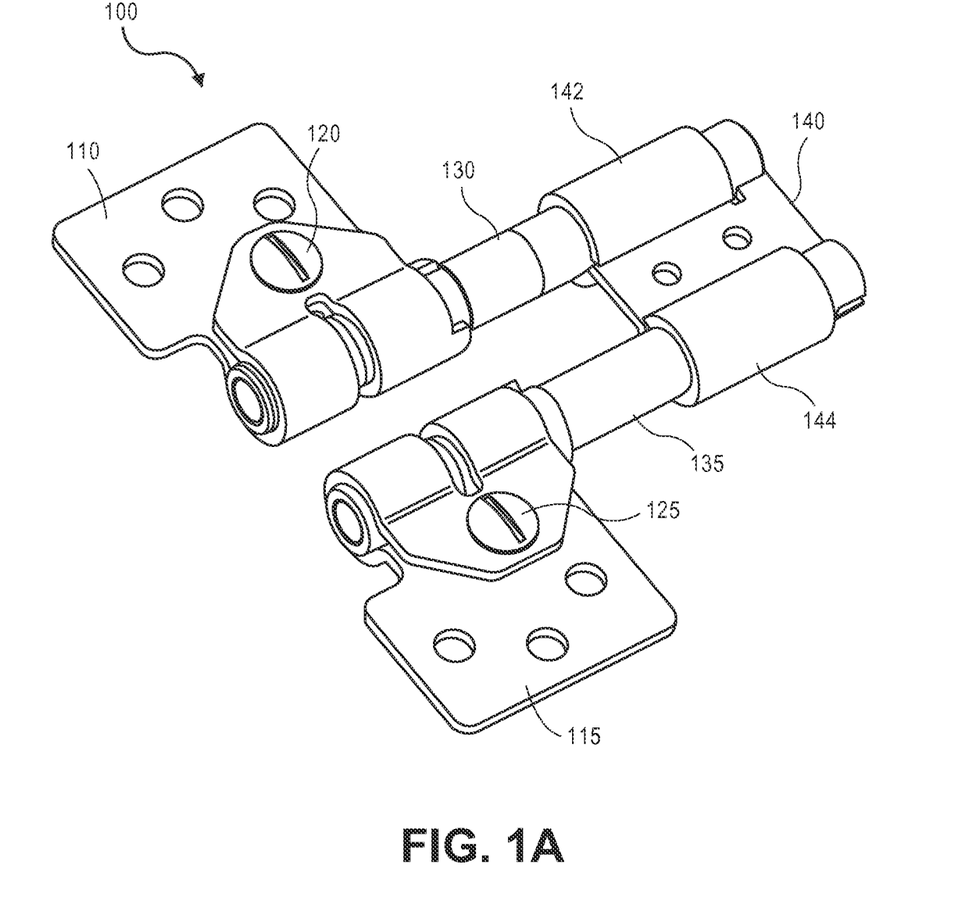
FIG. 1A illustrates a first view of adjustable tension hinge assembly in an open position according to an embodiment.

FIG. 1A illustrates a first view of an adjustable tension hinge assembly in an open position according to an embodiment. FIG. 1A illustrates adjustable tension hinge assembly 100, and a second hinge assembly 190 that may be paired with the hinge assembly 110 is illustrated in FIG. 1C, such as in the system illustrated in FIG. 5. However, embodiments are not limited to this type of implementation.

As illustrated in the first view (an auxiliary view as described herein), the hinge assembly 100 includes a first wrap end component 110 (generally referred to herein as a wrap end) for attachment to a first subpart of an apparatus (the apparatus not being shown in FIG. 1A) and a second wrap end 115 for attachment to a second subpart of the apparatus. The first wrap end 110 and the second wrap end 115 are illustrated as each including three through holes for coupling of the hinge assembly 100 to the subparts of the apparatus, but embodiments are not limited to this particular coupling mechanism.

In some embodiments, the first wrap end 110 is wrapped at least in part around a first portion of a first axle 130 adjacent to a first end of the first axle 130, the first wrap end 110 being rotationally coupled with the first axle 130, and the second wrap end 115 is wrapped at least in part around a first portion of a second axle 135 adjacent to a first end of the second axle 135, the second wrap end 115 being rotationally coupled with the second axle 135. In some embodiments, the first wrap end 110 includes holes for a first tension screw 120 and the first wrap end 115 includes holes for a first tension screw 125, wherein the tension screw provides for adjustment of the tension (or torque specification) of each wrap end on the respective axle. The first axle 130 and second axle 135 may be manufactured of various materials depending on the implementation, including the use of steel to provide axles that do not provide excessive friction. In some embodiments, one or both axles 130-135 may be cylindrical with a hole through the axles, and in other embodiments one or both axles may be solid material.

In some embodiments, the hinge assembly 100 further includes a center bracket 140 to couple the first axle 130 and the second axle 135 in the hinge assembly 100. The center bracket 140 includes a first cylindrical section 142, wherein a second portion of the first axle 130 (adjacent to a second end of the first axle 130) is surrounded by the first cylindrical section 142; and includes a second cylindrical section 144, a second portion of the second axle 135 (adjacent to a second end of the second axle 135) is surrounded by the second cylindrical section 144. In this manner, the center bracket 140 provides a certain spacing between the first axle 130 and the second axle 135. In some embodiments, positions of the first axle 130 and second axle 135 in relation to the center bracket 140 may be locked by tabs of the center bracket 140 that fit into notches in the second ends of the first axle 130 and second axle 135, as illustrated in FIG. 1C. However, embodiments are not limited to this particular implementation for locking positions of the axles in relation to center bracket 140. In an alternative embodiment, positions of the first axle 130 and second axle 135 in relation to the center bracket 140 may be locked by tabs in each of first axle 130 and second axle 135 that fit into notches in the center bracket 140.

In some embodiment, a hinge assembly, such as hinge assembly 100 illustrated in FIG. 1A, includes a rotation stop that allows for a certain amount of rotation. In some embodiments, the hinge assembly may allow for, for example, 360° (360 degrees) of rotation, with each of wrap ends being rotatable 180°. Such a structure allows, for example, a panel section of a convertible system to rotate all the way around 360° from a closed position into a "tablet mode." In some embodiments, a ball detent or similar element is to hold one wrap end stationary in relation to the associated axle for the wrap end while a subpart, such as a display panel, attached to the other wrap end rotates a full 180°. In some embodiments, for such an implementation, moving the display panel further will overcome the detent force and the additional 180° rotation may be achieved.

In other embodiments, the hinge assembly the rotation stop allows for a rotation of less than 360°. In a particular example, a hinge assembly may allow for a rotation of 180°, with each wrap ends being rotatable 90°. Such a structure allows, for example, a panel section of a laptop computer to extend from a closed position to a flat position. Elements of a rotation stop may be as illustrated in FIGS. 1B and 1C.

Figure 1B:
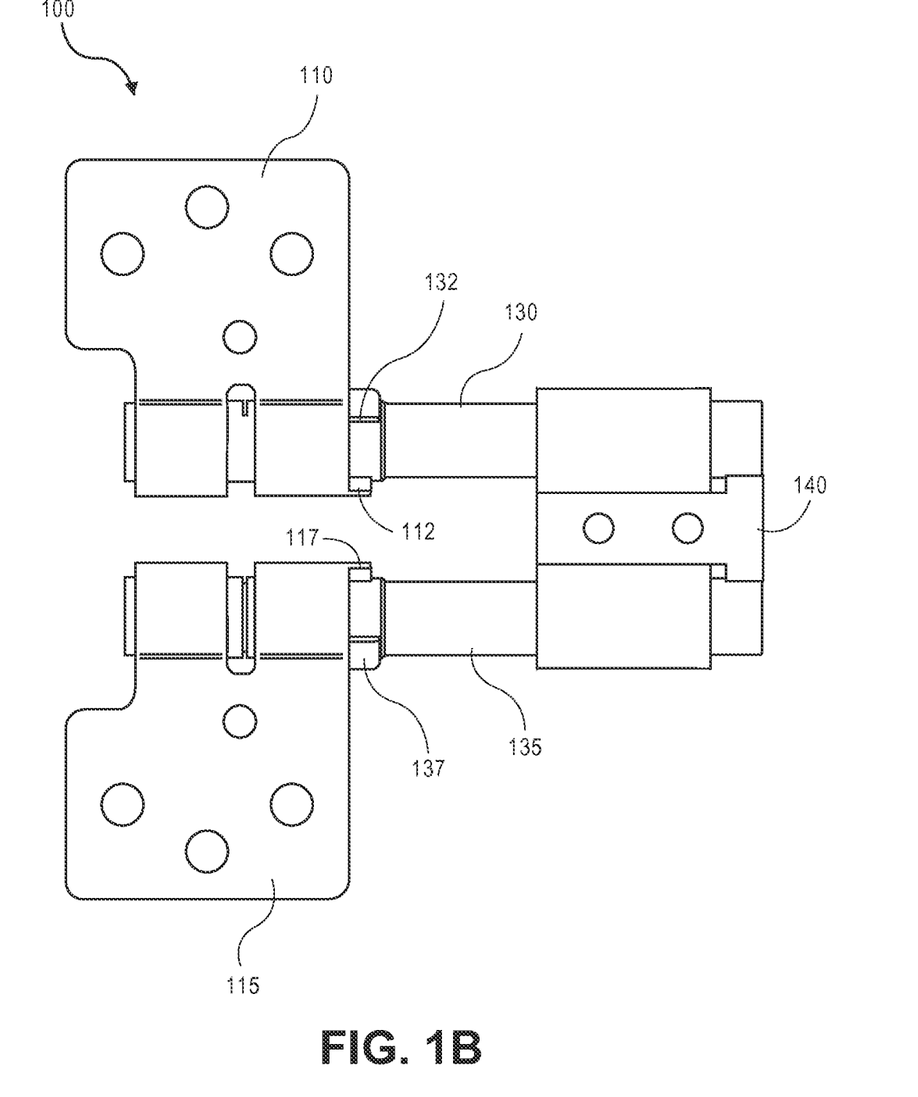
FIG. 1B illustrates a second view of adjustable tension hinge assembly in an open position according to an embodiment.
Figure 1C:
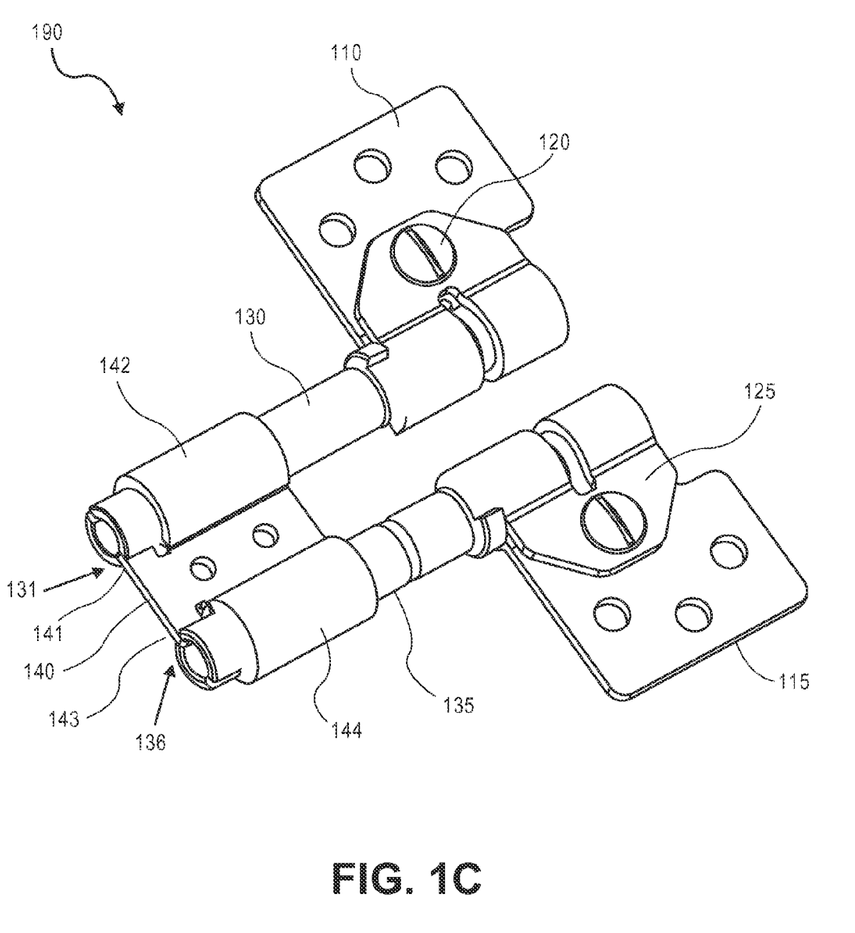
FIG. 1C illustrates a third view of an adjustable tension hinge assembly in an open position according to an embodiment.

FIG. 1B illustrates a second view of adjustable tension hinge assembly in an open position according to an embodiment. As illustrated in the second view (a top view of the adjustable tension hinge assembly 100), the hinge assembly 100 again includes the first wrap end 110 wrapped at least in part around a first portion of the first axle 130 and the second wrap end 115 wrapped at least in part around a first portion the second axle 135; and the center bracket 140 including the first cylindrical section 142 surrounding a second portion of the first axle 130 and the second cylindrical section 144 surrounding a second portion of the second axle 135.

In some embodiments, to provide a rotational stop each axle and wrap end includes a mechanical stop, the mechanical stops to limit each axles to the desired rotation, such as 90° for each axle. As illustrated in FIG. 1B, the first wrap end 110 includes a first wrap end mechanical stop 112 to engage with a first axle mechanical stop 132 of the first axle 130 when rotated to a certain position, and the second wrap end 115 includes a second wrap end mechanical stop 117 to engage with a second axle mechanical stop 137 of the second axle 135 when rotated to a particular position.

FIG. 1C illustrates a third view of an adjustable tension hinge assembly in an open position according to an embodiment. FIG. 1C illustrates a second adjustable tension hinge assembly 190 that may be paired with the hinge assembly 100 illustrated in FIGS. 1A and 1B to form an adjustable tension hinge system. As illustrated in FIG. 1C, the hinge assembly 190 again includes the first wrap end 110 wrapped at least in part around a first portion of the first axle 130 and the second wrap end 115 wrapped at least in part around a first portion of the second axle 135; and the center bracket 140 including the first cylindrical section 142 surrounding a second portion of the first axle 130 and the second cylindrical section 144 surrounding a second portion of the second axle 135.

In some embodiments, the center bracket 140 includes a first tab 141 that fits into a notch 131 in a second end of the first axle 130, and a second tab 143 that fits into a notch 136 in the end of the second axle 135. In this manner, a position of each of the first axle 130 and the second axle 135 may be easily locked in place, thus enabling the rotation stop of the first wrap end 110 and the second wrap end 115 around the first axle 130 and the second axle 135 respectively.

Figure 2A:
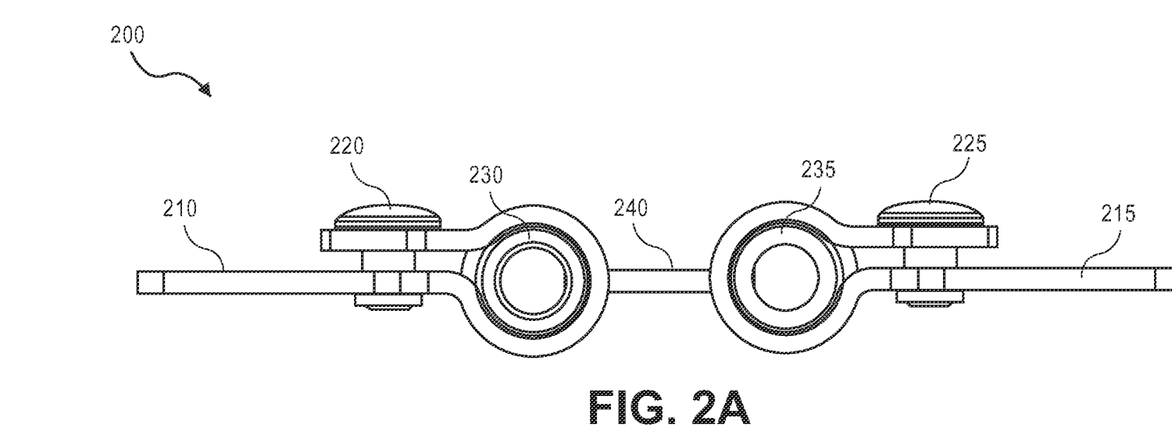
FIG. 2A illustrates an end view of an adjustable tension hinge assembly according to an embodiment.
Figure 2B:
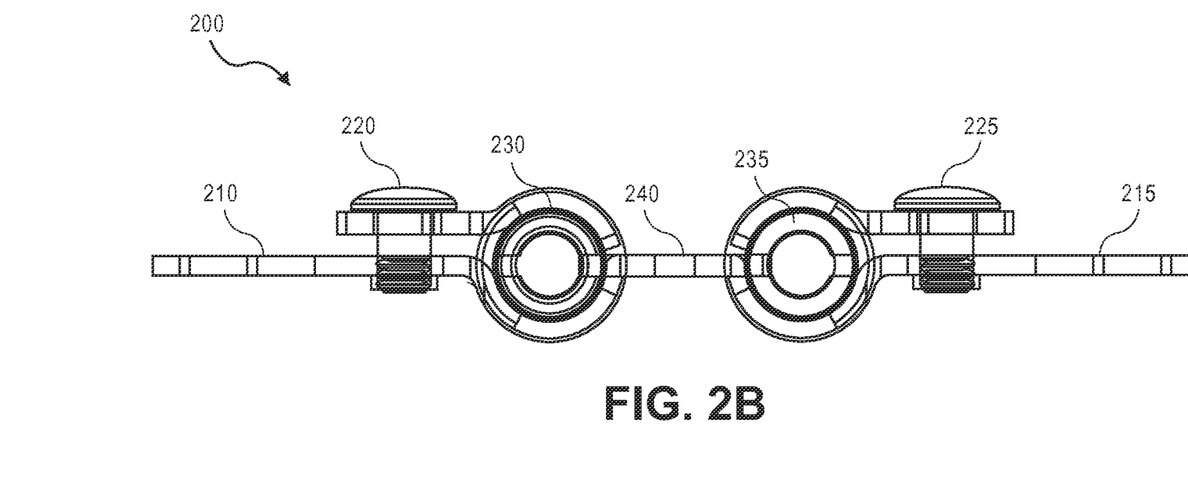
FIG. 2B illustrates a cutaway end view of an adjustable tension hinge assembly according to an embodiment.

FIG. 2A illustrates an end view of an adjustable tension hinge assembly according to an embodiment, and FIG. 2B illustrates a cutaway end view of an adjustable tension hinge assembly according to an embodiment. As shown, FIGS. 2A and 2B illustrate a hinge assembly such as illustrated in FIGS. 1A, 1B, and 1C. In some embodiments, the hinge assembly 200 includes a first wrap end 210 (with first tension screw 220) wrapped around a first axle 230 and a second wrap end 215 (with second tension screw 225) wrapped around a second axle 235; and a center bracket 240 to hold the first axle 230 and second axle 235 a certain distance apart.

FIG. 2B further illustrates the threads of the first tension screw 220 and second tension screw 225. In some embodiments, each wrap end may include a first hole through a first wrap extension of the wrap end that is without threads and a second hole with threads in a second wrap extension of the wrap end, such that tightening the tension screw will tend to draw the first wrap extension towards the second wrap extension, and thus increase torque on the axle around which the wrap end is wrapped.

Figure 3:
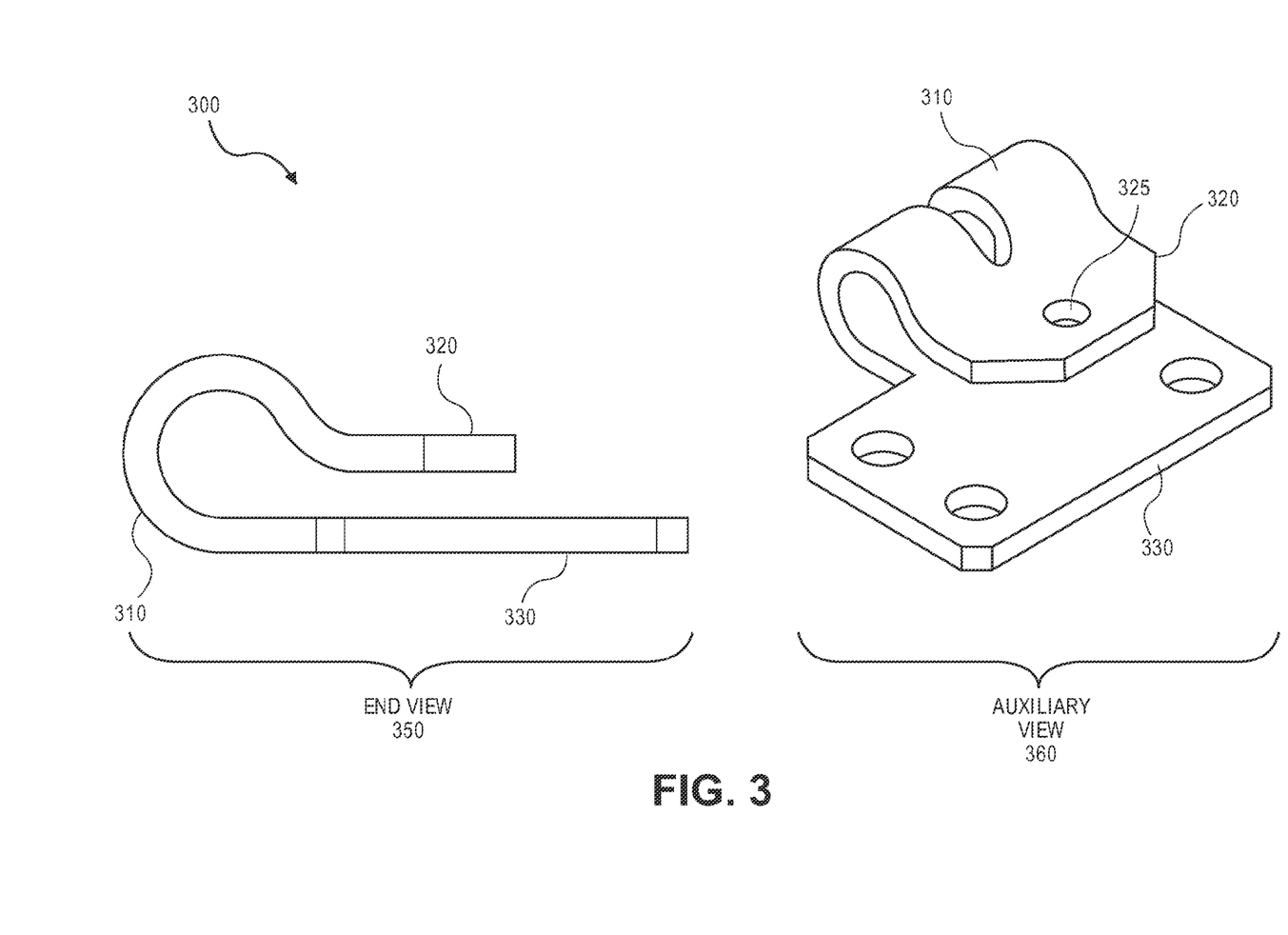
FIG. 3 illustrates a wrap end component for an adjustable tension hinge assembly according to an embodiment.

FIG. 3 illustrates a wrap end component for an adjustable tension hinge assembly according to an embodiment. As provided in FIG. 3, there is an end view 350 of the wrap end component (generally referred to herein as a wrap end) 300 and an auxiliary view 360 of the wrap end 300. In some embodiments, the wrap end 300, such as the wrap ends illustrated in FIGS. 1A-2B, includes a curved wrap section 310 to wrap around an axle, a first wrap extension 320 (which may be, but is not limited to, a shorter wrap extension), and a second wrap extension 330 (which may be, but is not limited to, a longer wrap extension).

In some embodiments, as shown in the end view 350, the second wrap extension 330 may extend directly from the curved wrap section 310 (such that the wrap end 300 can set flat against a flat surface and the first wrap extension 320 may include a curved element such that the first wrap extension 320 is parallel or nearly parallel with the second wrap extension 330.

In some embodiments, as shown in the auxiliary view 360, the first wrap extension 320 includes a non-threaded hole 325 for insertion of a tension screw (not shown in FIG. 3), where the second wrap extension 330 may include a threaded hole such that the tightening of the tension screw will draw the first wrap extension 310 and the second wrap extension together to provide tension on an axle that is wrapped at least in part by the wrap end 300.

Figure 4A:
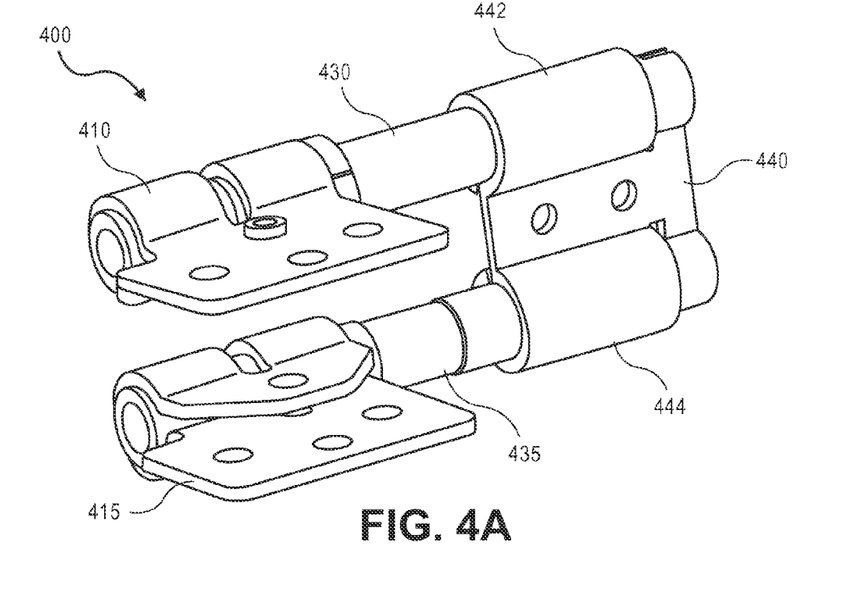
FIG. 4A illustrates a first view of an adjustable tension hinge assembly in a closed position according to an embodiment.
Figure 4B:
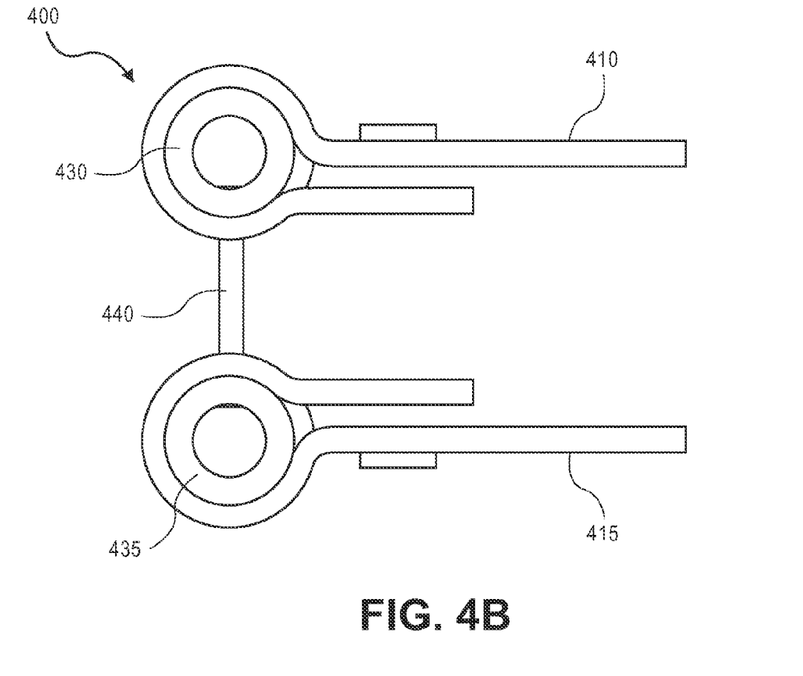
FIG. 4B illustrates a second view of an adjustable tension hinge assembly in a closed position according to an embodiment.

FIG. 4A illustrates a first view of an adjustable tension hinge assembly in a closed position according to an embodiment, and FIG. 4B illustrates a second view of an adjustable tension hinge assembly in a closed position according to an embodiment. As illustrated, an adjustable tension hinge assembly 400 includes a first wrap end 410 wrapped at least in part around a first portion of a first axle 430 and a second wrap end 415 wrapped at least in part around a first portion of a second axle 435; and a center bracket 440 including a first cylindrical section 442 surrounding a second portion of the first axle 430 and a second cylindrical section 444 surrounding a second portion of the second axle 435.

Figure 5:
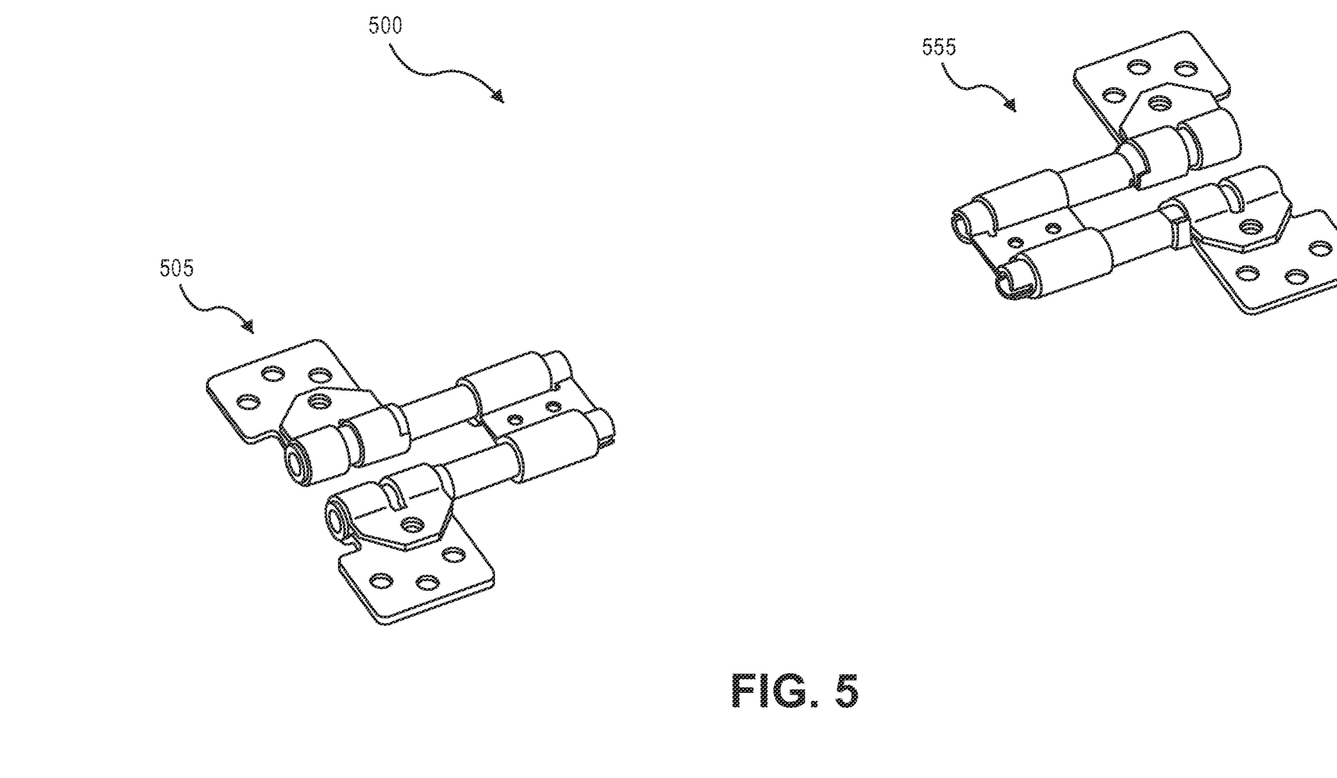
FIG. 5 is an illustration of an adjustable tension hinge assembly according to an embodiment.

FIG. 5 is an illustration of an adjustable tension hinge system according to an embodiment. In some embodiments, an adjustable tension hinge system 500 includes a plurality of adjustable tension hinge assemblies. A plurality of adjustable tension hinge assemblies may include a first adjustable tension hinge assembly 505, such as the hinge assembly 100 illustrated in FIG. 1A, and a second adjustable tension hinge assembly 555, such as the hinge assembly 190 illustrated in FIG. 1C. While FIG. 5 illustrates two hinge assemblies, embodiments are not limited to this number of assemblies.

In some embodiments, the first hinge assembly 505 and second hinge assembly 555 provide for rotationally coupling a first subpart and a second subpart of a mobile device. In some embodiments, an adjustable tension hinge system 500 may alternatively include a mixture of adjustable tension and non-adjustable tension hinge assemblies.

In some embodiments, the first hinge assembly 505 and second hinge assembly 555 (and any other hinge assemblies of the system 500) may be physically separated, as illustrated in FIG. 5. In some embodiments, two or more hinge assemblies may be coupled together. In some embodiments, the adjustable hinge system 500 may further include a cover (or covers) to enclose all or a portion of the first hinge assembly 505 and second hinge assembly 555, which may include enclosure of a space between the first hinge assembly 505 and second hinge assembly 555.

Figure 6:
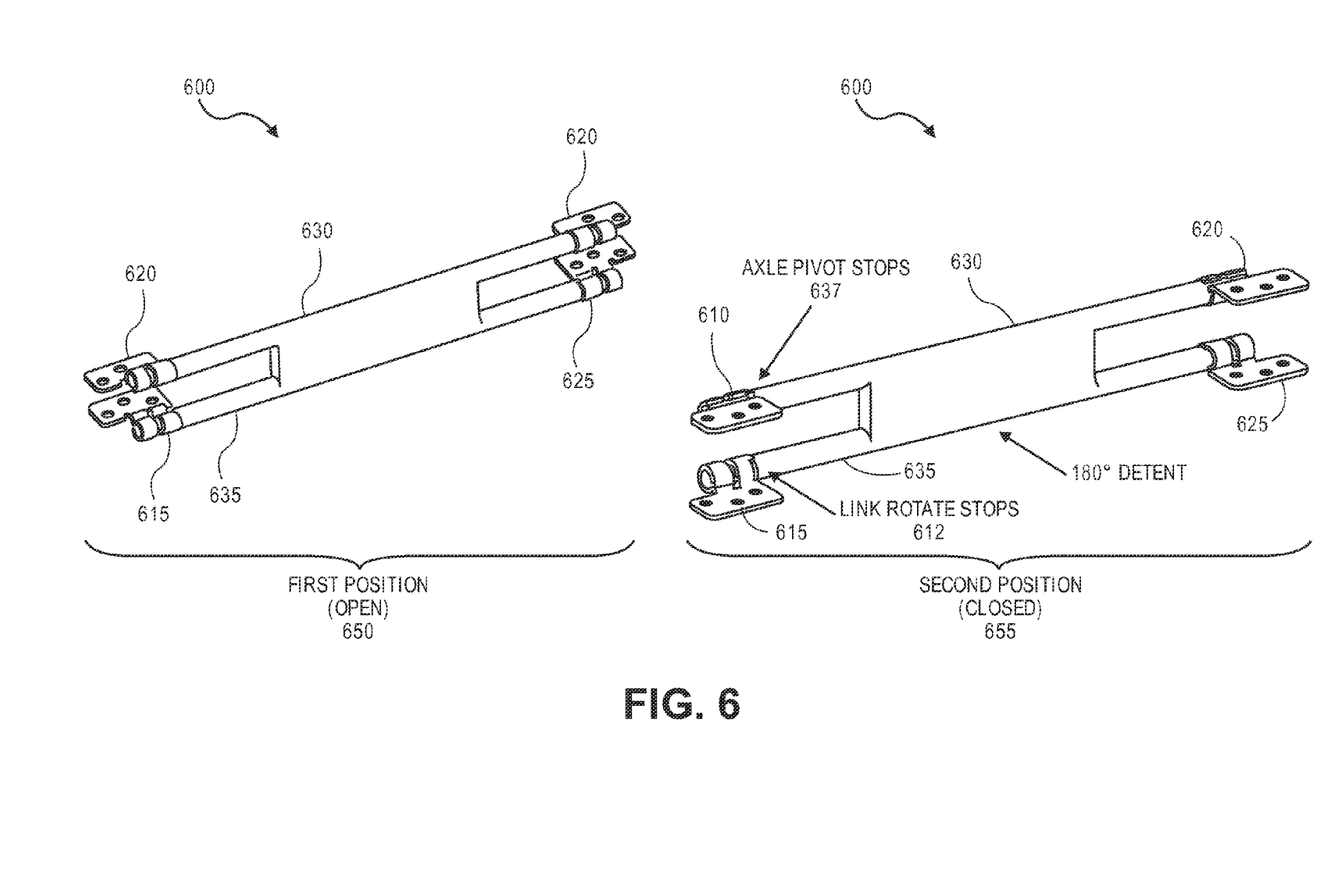
FIG. 6 is an illustration of an alternative hinge system according to an embodiment.

FIG. 6 is an illustration of an alternative hinge system according to an embodiment. In some embodiments, a hinge system 600 is illustrated in a first position 650, which may be a fully open position (such as a position of a convertible computer in which the display screen is rotated fully around to a tablet mode position), and a second position 655, which may be a closed position. In some embodiments, the hinge system 600 includes a first pair of wrap end hinges including first wrap end hinge 610 and second wrap end hinge 615, a second pair of wrap end hinges including third wrap end hinge 620 and fourth wrap end hinge 625, and a center section 630 that provides an axle 635 for each of the hinges, each of the wrap end hinges 610-625 being wrapped at least in part around one of the axles 635 of the middle section 630. In some embodiments, the wrap end hinges are as illustrated in FIG. 3 with the inclusion of tension screws to adjust tension, such as shown in FIGS. 1A to 2B.

In some embodiments, the hinge system 600 provides 360° of rotation from the first position 650 to the second position 655, with each of the wrap end hinges 610-625 being operable to rotate 180° as limited by a rotation stop implemented by link rotation stops 612. In addition, the wrap end hinges are prevented from over-rotating beyond the closed position by axle pivot stops 637 for each axle 635 of the center section 630. In some embodiments, the center section 630 includes 180° detent to provide a stop at a 180° rotation from the closed position 655, with further force providing further rotation to the open position 650.

Figure 7:
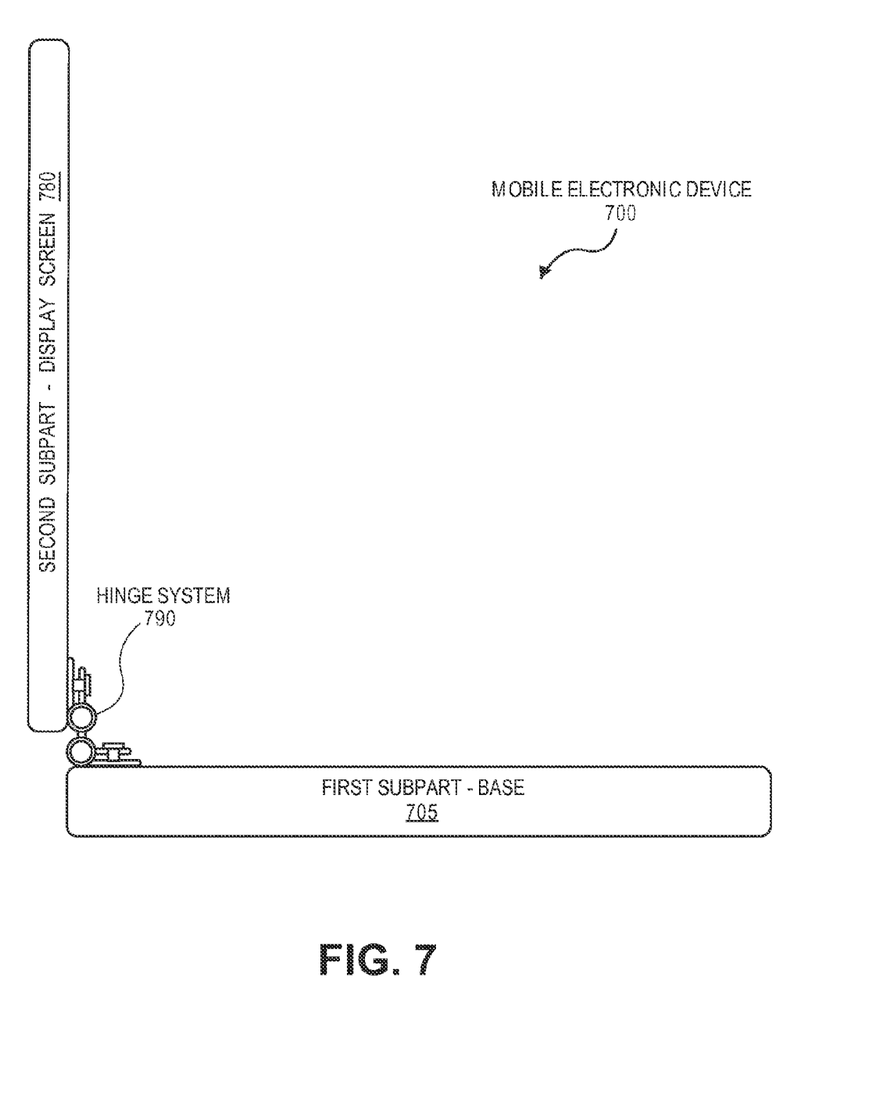
FIG. 7 is an illustration of a mobile electronic device including an adjustable tension hinge system according to an embodiment.

FIG. 7 is an illustration of a mobile electronic device including an adjustable tension hinge system according to an embodiment. In some embodiments, a mobile electronic device 700 includes a first subpart designed as the base 705 and a second subpart designated as the display screen 780. As illustrated, the mobile electronic device 700 may be a laptop computer or a notebook computer, but embodiments are not limited to these particular implementations.

In some embodiments, the display screen 780 is rotationally coupled with the base 705 by an adjustable tension hinge system 790. In some embodiments, the hinge system 790 includes a plurality of hinge assemblies, wherein each of the hinge assemblies is as illustrated in FIGS. 1A to 2B. In some embodiments, the hinge system 790 may alternatively include a mixture of adjustable tension and non-adjustable tension hinge assemblies.

In some embodiments, one or more of the hinge assemblies of the adjustable hinge system 790 include one or more hollow axles. Stated in another way, one or axles of the hinge assemblies includes a hole that passes through the axle from a first end to a second end of the axle. In some embodiments, one or more wires or cables pass through at least one axle of the hinge assemblies to provide an electrical, optical, or other connection, wherein the connection may be between the first subpart 705 and the second subpart 780 or between a first location and a second location of a same subpart.

Figure 8:
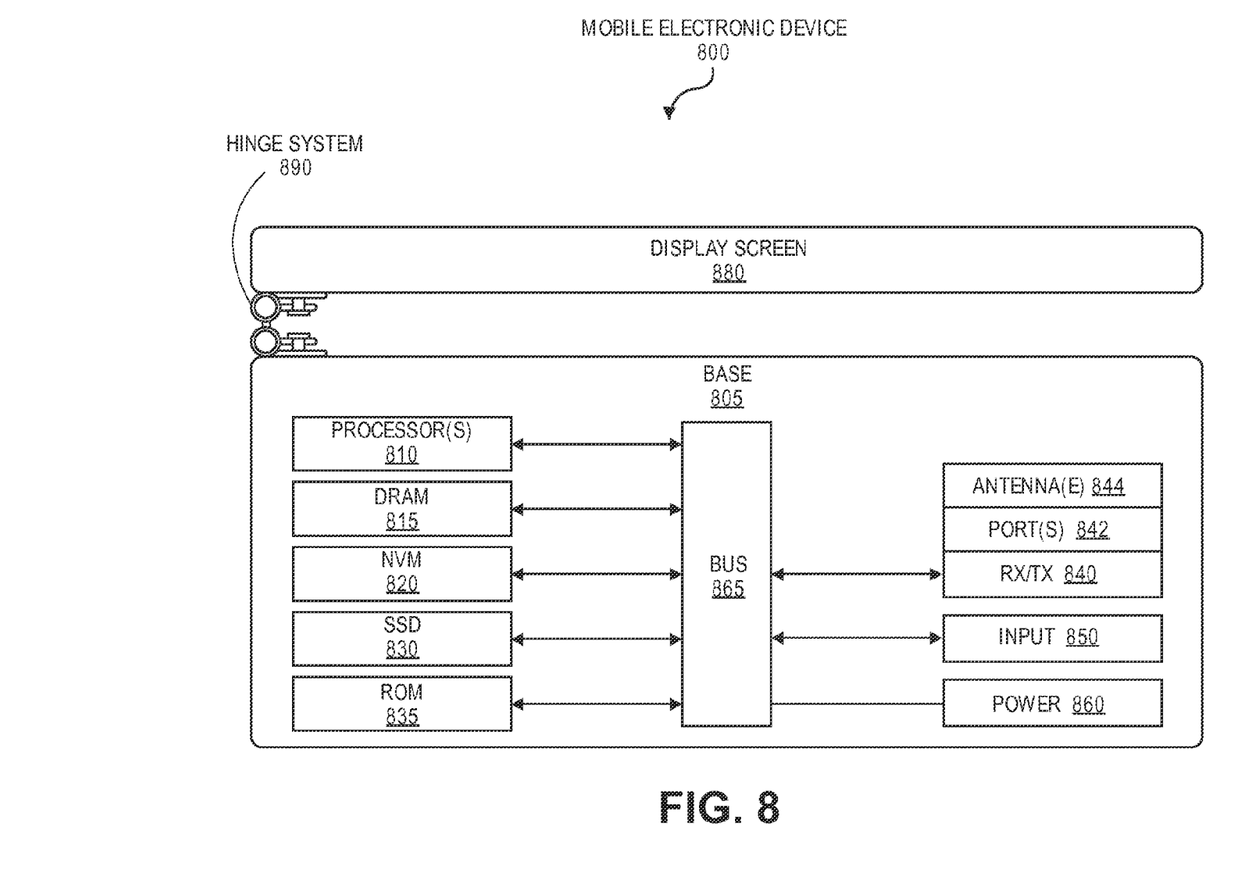
FIG. 8 is an illustration of components of a mobile electronic device including an adjustable tension hinge system according to an embodiment.

FIG. 8 is an illustration of components of a mobile electronic device including an adjustable tension hinge system according to an embodiment. In some embodiments, a mobile electronic device 800 includes a first subpart designed as the base 805, which may include one or more electronic components, and a second subpart designated as the display screen 880. It is noted that the elements of the device 800 are not intended to be illustrated to scale, but rather are illustrated to show components that may be included in the device 800.

As illustrated in FIG. 8, the mobile electronic device 800 may be a laptop computer or a notebook computer, but embodiments are not limited to these particular implementations. In some embodiments, the display screen 880 is rotationally coupled with the base 805 by an adjustable tension hinge system 890. In some embodiments, the hinge system 890 includes a plurality of hinge assemblies, wherein each of the hinge assemblies is as illustrated in FIGS. 1A to 2B. In some embodiments, the hinge system 890 may alternatively include a mixture of adjustable tension and non-adjustable tension hinge assemblies. In this illustration, certain standard and well-known components that are not germane to the present description are not shown. Elements shown as separate elements may be combined, including, for example, an SoC (System on Chip) combining multiple elements on a single chip. As illustrated in FIG. 8, certain electronic components are illustrated as being located in the base 805 subpart. However, one or more of the components may be included in the display screen 880 subpart.

In some embodiments, the device 800 may include a processing means such as one or more processors 810 coupled to one or more buses or interconnects, shown in general as bus 865. The processors 810 may comprise one or more physical processors and one or more logical processors. In some embodiments, the processors 810 may include one or more general-purpose processors or special-purpose processors.

The bus 865 is a communication means for transmission of data. The bus 865 is illustrated as a single bus for simplicity, but may represent multiple different interconnects or buses and the component connections to such interconnects or buses may vary. The bus 865 shown in FIG. 8 is an abstraction that represents any one or more separate physical buses, point-to-point connections, or both connected by appropriate bridges, adapters, or controllers.

In some embodiments, the device 800 further comprises dynamic random access memory (DRAM) or other dynamic storage device or element as a main memory for storing information and instructions to be executed by the processors 810. Main memory may include, but is not limited to, dynamic random access memory (DRAM) 815.

The device 800 also may comprise a non-volatile memory (NVM) 820; a storage device such as a solid state drive (SSD) 830; and a read only memory (ROM) 835 or other static storage device for storing static information and instructions for the processors 810.

In some embodiments, the device 800 includes one or more transmitters or receivers (TX/RX) 840 coupled to the bus 865. In some embodiments, the device 800 may include one or more antennae 844, such as dipole or monopole antennae, for the transmission and reception of data via wireless communication using a wireless transmitter, receiver, or both, and one or more ports 844 for the transmission and reception of data via wired communications. Wireless communication includes, but is not limited to, Wi-Fi, Bluetooth™, near field communication, and other wireless communication standards.

In some embodiments, the device 800 includes one or more input devices 850 for the input of data, including hard and soft buttons, a joy stick, a mouse or other pointing device, a keyboard, voice command system, or gesture recognition system.

In some embodiments, the device 800 includes the display screen 880, where the display 880 may include a liquid crystal display (LCD) or any other display technology, for displaying information or content to a user. In some environments, the display screen 880 may include a touch-screen that is also utilized as at least a part of an input device 850. Output for the device 800 may further include audio output, including one or more speakers, audio output jacks, or other audio, and other output to a user.

The device 800 may also comprise a battery or other power source 860, which may include a solar cell, a fuel cell, a charged capacitor, near field inductive coupling, or other system or device for providing or generating power in the device 800. The power provided by the power source 860 may be distributed as required to elements of the device 800.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a hinge assembly includes a first wrap end component and a second wrap end component; a first axle and a second axle, the wrap section of the first wrap end component being wrapped at least in part around a first portion of the first axle adjacent to a first end of the first axle, and the wrap section of the second wrap end component being wrapped at least in part around a first portion of the second axle adjacent to a first end of the second axle; and a first tension screw to adjust a tension of the first wrap end component on the first axle and a second tension screw to adjust a tension of the second wrap end component on the second axle.

In some embodiments, each of the first wrap end component and second wrap end component include a curved wrap section, a first wrap extension, and a second wrap extension, wherein the first tension screw is operable to draw the first wrap extension and second wrap extension of the first wrap end component together and the second tension screw is operable to draw the first wrap extension and second wrap extension of the second wrap end component together.

In some embodiments, the first wrap end component includes a first hole in the first wrap extension and a second threaded hole in the second wrap extension for the first tension screw; and the second wrap end component includes a first hole in the first wrap extension and a second threaded hole in the second wrap extension for the second tension screw.

In some embodiments, the hinge assembly further includes a center bracket to couple the first axle and the second axle.

In some embodiments, the center bracket includes: a first cylindrical section, the first cylindrical section surrounding a second portion of the first axle adjacent to a second end of the first axle; and a second cylindrical section, the second cylindrical section surrounding a second portion of the second axle adjacent to a second end of the second axle.

In some embodiments, the center bracket includes a first tab to fit into a notch in the first axle and a second tab to fit into a notch in the second axle.

In some embodiments, the hinge assembly further includes a first rotation stop for the first wrap end component and a second rotation stop for the second wrap end component.

In some embodiments, the first rotation stop includes a mechanical stop in the first wrap end component and a mechanical stop in the first axle, and the second rotation stop includes a mechanical stop in the second wrap end component and a mechanical stop in the second axle.

In some embodiments, the hinge assembly provides a rotation of 360 degrees.

In some embodiments, the first wrap end component provides a rotation of 180 degrees and the second wrap end component provides a rotation of 180 degrees. In some embodiments, the hinge assembly includes a ball detent to hold either the first wrap end component or the second wrap end component stationary in relation to the associated axle while the other of the first wrap end component or second wrap end component rotates 180 degrees.

In some embodiments, one or both of the first axle and the second axle include a hole through the axle from the first end of the axle to the second end of the axle.

In some embodiments, a hinge system includes a first hinge assembly; and a second hinge assembly, wherein either or both of the first hinge assembly and the second hinge assembly are adjustable tension hinge assemblies including: a first wrap end component and a second wrap end component; a first axle and a second axle, the wrap section of the first wrap end component being wrapped at least in part around a first portion of the first axle adjacent to a first end of the first axle, and the wrap section of the second wrap end component being wrapped at least in part around a first portion of the second axle adjacent to a first end of the second axle; and a first tension screw to adjust a tension of the first wrap end component on the first axle and a second tension screw to adjust a tension of the second wrap end component on the second axle.

In some embodiments, each adjustable tension hinge assembly includes a center bracket to couple the first axle and the second axle of the hinge assembly, wherein the center bracket includes a first cylindrical section, the first cylindrical section surrounding a second portion of the first axle adjacent to a second end of the first axle; and a second cylindrical section, the second cylindrical section surrounding a second portion of the second axle adjacent to a second end of the second axle.

In some embodiments, the center bracket includes a first tab to fit into a notch in the first axle and a second tab to fit into a notch in the second axle.

In some embodiments, one or more adjustable tension hinge assemblies of the hinge system includes a first rotation stop for the first wrap end component and a second rotation stop for the second wrap end component.

In some embodiments, the first hinge assembly and the second hinge assembly are physically separated from each other.

In some embodiments, the first hinge assembly and the second hinge assembly are coupled together.

In some embodiments, the hinge system further includes a cover to cover all or a portion of the first hinge assembly and the second hinge assembly.

In some embodiments, a mobile electronic device includes a first subpart including a touch screen display; a second subpart including one or more electronic components; and a hinge system including a first hinge assembly and a second hinge assembly, wherein: the first hinge assembly is coupled with the first subpart at a first location and the second subpart at a second location, and second hinge assembly is coupled with the first subpart at a third location and the second subpart at a fourth location; wherein either or both of the first hinge assembly and the second hinge assembly are adjustable tension hinge assemblies including: a first wrap end component and a second wrap end component; a first axle and a second axle, the wrap section of the first wrap end component being wrapped at least in part around a first portion of the first axle adjacent to a first end of the first axle, and the wrap section of the second wrap end component being wrapped at least in part around a first portion of the second axle adjacent to a first end of the second axle; and a first tension screw to adjust a tension of the first wrap end component on the first axle and a second tension screw to adjust a tension of the second wrap end component on the second axle.

In some embodiments, each adjustable tension hinge assembly of the hinge system includes a center bracket to couple the first axle and the second axle of the hinge assembly, wherein the center bracket includes: a first cylindrical section, the first cylindrical section surrounding a second portion of the first axle adjacent to a second end of the first axle; and a second cylindrical section, the second cylindrical section surrounding a second portion of the second axle adjacent to a second end of the second axle.

In some embodiments, one or more adjustable tension hinge assembly of the hinge system includes a first rotation stop for the first wrap end component and a second rotation stop for the second wrap end component.

In some embodiments, the hinge system provides a rotation of 360 degrees.

In some embodiments, at least one axle of one or more adjustable tension hinge assemblies of the hinge system includes a hole through the axle from the first end of the axle to the second end of the axle.

In some embodiments, the mobile electronic device further includes one or more wires or cables passing through the hole in the at least one axle.

In some embodiments, the one or more wires or cables passing through the hole in the at least one axle provide one or more connections between the first subpart and the second subpart.

In some embodiments, the mobile electronic device is a laptop computer or a notebook computer.

What is claimed is:

1. A hinge assembly comprising:
a first wrap end component and a second wrap end component, wherein each of the first wrap end component and the second wrap end component includes a curved wrap section;
a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
a center bracket to couple the first axle and the second axle, wherein the center bracket includes:
a first cylindrical section, the first cylindrical section surrounding a second portion of the first axle adjacent to a second end of the first axle, and
a second cylindrical section, the second cylindrical section surrounding a second portion of the second axle adjacent to a second end of the second axle; and
a first tension screw to adjust a tension of the first wrap end component on the first axle and a second tension screw to adjust a tension of the second wrap end component on the second axle;
wherein the center bracket includes a first tab to fit into a notch in the first axle to lock a position of the first axle in relation to the center bracket and a second tab to fit into a notch in the second axle to lock a position of the second axle in relation to the center bracket.

2. The hinge assembly of claim 1, wherein each of the first wrap end component and second wrap end component further includes a first wrap extension and a second wrap extension, wherein the first tension screw is operable to draw the first wrap extension and second wrap extension of the first wrap end component together and the second tension screw is operable to draw the first wrap extension and second wrap extension of the second wrap end component together.

3. The hinge assembly of claim 2, wherein:
the first wrap end component includes a first hole in the first wrap extension and a second threaded hole in the second wrap extension for the first tension screw; and
the second wrap end component includes a first hole in the first wrap extension and a second threaded hole in the second wrap extension for the second tension screw.

4. The hinge assembly of claim 1, further comprising a first rotation stop for the first wrap end component and a second rotation stop for the second wrap end component.

5. The hinge assembly of claim 4, wherein the first rotation stop includes a mechanical stop in the first wrap end component and a mechanical stop in the first axle, and the second rotation stop includes a mechanical stop in the second wrap end component and a mechanical stop in the second axle.

6. The hinge assembly of claim 5, wherein the hinge assembly provides a rotation of 360 degrees.

7. The hinge assembly of claim 1, wherein one or both of the first axle and the second axle include a hole through the axle from the first end of the axle to the second end of the axle.

8. A hinge system comprising:
a first hinge assembly; and
a second hinge assembly;

wherein either or both of the first hinge assembly and the second hinge assembly are adjustable tension hinge assemblies including:
- a first wrap end component and a second wrap end component, wherein each of the first wrap end component and the second wrap end component includes a curved wrap section;
- a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
- a center bracket to couple the first axle and the second axle of the hinge assembly, wherein the center bracket includes:
  - a first cylindrical section, the first cylindrical section surrounding a second portion of the first axle adjacent to a second end of the first axle, and
  - a second cylindrical section, the second cylindrical section surrounding a second portion of the second axle adjacent to a second end of the second axle; and
- a first tension screw to adjust a tension of the first wrap end component on the first axle and a second tension screw to adjust a tension of the second wrap end component on the second axle;
- wherein the center bracket includes a first tab to fit into a notch in the first axle to lock a position of the first axle in relation to the center bracket and a second tab to fit into a notch in the second axle to lock a position of the second axle in relation to the center bracket.

9. The hinge system of claim 8, wherein one or more adjustable tension hinge assemblies of the hinge system includes a first rotation stop for the first wrap end component and a second rotation stop for the second wrap end component.

10. The hinge system of claim 8, wherein the first hinge assembly and the second hinge assembly are physically separated from each other.

11. The hinge system of claim 8, wherein the first hinge assembly and the second hinge assembly are coupled together.

12. A mobile electronic device comprising:
- a first subpart including a touch screen display;
- a second subpart including one or more electronic components; and
- a hinge system including a first hinge assembly and a second hinge assembly, wherein:
  - the first hinge assembly is coupled with the first subpart at a first location and the second subpart at a second location, and
  - the second hinge assembly is coupled with the first subpart at a third location and the second subpart at a fourth location;
- wherein either or both of the first hinge assembly and the second hinge assembly are adjustable tension hinge assemblies including:
  - a first wrap end component and a second wrap end component, wherein each of the first wrap end component and the second wrap end component includes a curved wrap section;
  - a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
  - a center bracket to couple the first axle and the second axle of the hinge assembly, wherein the center bracket includes:
    - a first cylindrical section, the first cylindrical section surrounding a second portion of the first axle adjacent to a second end of the first axle, and
    - a second cylindrical section, the second cylindrical section surrounding a second portion of the second axle adjacent to a second end of the second axle; and
  - a first tension screw to adjust a tension of the first wrap end component on the first axle and a second tension screw to adjust a tension of the second wrap end component on the second axle;
  - wherein the center bracket includes a first tab to fit into a notch in the first axle to lock a position of the first axle in relation to the center bracket and a second tab to fit into a notch in the second axle to lock a position of the second axle in relation to the center bracket.

13. The mobile electronic device of claim 12, wherein one or more adjustable tension hinge assembly of the hinge system includes a first rotation stop for the first wrap end component and a second rotation stop for the second wrap end component.

14. The mobile electronic device of claim 13, wherein the hinge system provides a rotation of 360 degrees.

15. The mobile electronic device of claim 12, wherein at least one axle of one or more adjustable tension hinge assemblies of the hinge system includes a hole through the axle from the first end of the axle to the second end of the axle.

16. The mobile electronic device of claim 15, further comprising one or more wires or cables passing through the hole in the at least one axle.

17. The mobile electronic device of claim 16, wherein the one or more wires or cables passing through the hole in the at least one axle provide one or more connections between the first subpart and the second subpart.

18. A hinge assembly comprising:
- a first wrap end component and a second wrap end component, wherein each of the first wrap end component and the second wrap end component includes a curved wrap section;
- a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
- a center bracket to couple the first axle and the second axle;
- a first tension screw to adjust a tension of the first wrap end component on the first axle and a second tension screw to adjust a tension of the second wrap end component on the second axle; and
- a first rotation stop for the first wrap end component and a second rotation stop for the second wrap end component, wherein the first rotation stop includes a mechanical stop in the first wrap end component and a mechanical stop in the first axle, and the second rotation stop includes a mechanical stop in the second wrap end component and a mechanical stop in the second axle.

19. The hinge assembly of claim 18, wherein each of the first wrap end component and second wrap end component further includes a first wrap extension and a second wrap extension, wherein the first tension screw is operable to draw the first wrap extension and second wrap extension of the first wrap end component together and the second tension screw is operable to draw the first wrap extension and second wrap extension of the second wrap end component together.

20. The hinge assembly of claim 19, wherein:
the first wrap end component includes a first hole in the first wrap extension and a second threaded hole in the second wrap extension for the first tension screw; and
the second wrap end component includes a first hole in the first wrap extension and a second threaded hole in the second wrap extension for the second tension screw.

21. The hinge assembly of claim 18, wherein the hinge assembly provides a rotation of 360 degrees.

22. The hinge assembly of claim 18, wherein one or both of the first axle and the second axle include a hole through the axle from the first end of the axle to the second end of the axle.

23. A hinge system comprising:
a first hinge assembly; and
a second hinge assembly;
wherein either or both of the first hinge assembly and the second hinge assembly are adjustable tension hinge assemblies including:
a first wrap end component and a second wrap end component, wherein each of the first wrap end component and the second wrap end component includes a curved wrap section;
a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
a center bracket to couple the first axle and the second axle;
a first tension screw to adjust a tension of the first wrap end component on the first axle and a second tension screw to adjust a tension of the second wrap end component on the second axle; and
a first rotation stop for the first wrap end component and a second rotation stop for the second wrap end component, wherein the first rotation stop includes a mechanical stop in the first wrap end component and a mechanical stop in the first axle, and the second rotation stop includes a mechanical stop in the second wrap end component and a mechanical stop in the second axle.

24. The hinge system of claim 23, wherein the first hinge assembly and the second hinge assembly are physically separated from each other.

25. The hinge system of claim 23, wherein the first hinge assembly and the second hinge assembly are coupled together.

26. A mobile electronic device comprising:
a first subpart including a touch screen display;
a second subpart including one or more electronic components; and
a hinge system including a first hinge assembly and a second hinge assembly, wherein:
the first hinge assembly is coupled with the first subpart at a first location and the second subpart at a second location, and
the second hinge assembly is coupled with the first subpart at a third location and the second subpart at a fourth location;
wherein either or both of the first hinge assembly and the second hinge assembly are adjustable tension hinge assemblies including:
a first wrap end component and a second wrap end component, wherein each of the first wrap end component and the second wrap end component includes a curved wrap section;
a first axle and a second axle, the curved wrap section of the first wrap end component being wrapped at least in part around a first portion of the first axle adjacent to a first end of the first axle, and the curved wrap section of the second wrap end component being wrapped at least in part around a first portion of the second axle adjacent to a first end of the second axle;
a center bracket to couple the first axle and the second axle, a position of the first axle being locked in relation to the center bracket and a position of the second axle being locked in relation to the center bracket;
a first tension screw to adjust a tension of the first wrap end component on the first axle and a second tension screw to adjust a tension of the second wrap end component on the second axle; and
a first rotation stop for the first wrap end component and a second rotation stop for the second wrap end component, wherein the first rotation stop includes a mechanical stop in the first wrap end component and a mechanical stop in the first axle, and the second rotation stop includes a mechanical stop in the second wrap end component and a mechanical stop in the second axle.

27. The mobile electronic device of claim 26, wherein the hinge system provides a rotation of 360 degrees.

28. The mobile electronic device of claim 26, wherein at least one axle of one or more adjustable tension hinge assemblies of the hinge system includes a hole through the axle from the first end of the axle to the second end of the axle.

29. The mobile electronic device of claim 28, further comprising one or more wires or cables passing through the hole in the at least one axle.

30. The mobile electronic device of claim 29, wherein the one or more wires or cables passing through the hole in the at least one axle provide one or more connections between the first subpart and the second subpart.

* * * * *